US012182948B2

(12) United States Patent
Garrett et al.

(10) Patent No.: US 12,182,948 B2
(45) Date of Patent: Dec. 31, 2024

(54) AUGMENTED REALITY TRAFFIC ADVISOR SYSTEM AND METHOD

(71) Applicant: WHELEN ENGINEERING COMPANY, INC., Chester, CT (US)

(72) Inventors: Caleb Garrett, Essex, CT (US); Angelo Arcaria, Colchester, CT (US)

(73) Assignee: WHELEN ENGINEERING COMPANY, INC., Chester, CT (US)

(*) Notice: Subject to any disclaimer, the term of this patent is extended or adjusted under 35 U.S.C. 154(b) by 32 days.

(21) Appl. No.: 17/951,582

(22) Filed: Sep. 23, 2022

(65) Prior Publication Data
US 2023/0089396 A1    Mar. 23, 2023

Related U.S. Application Data

(60) Provisional application No. 63/247,743, filed on Sep. 23, 2021.

(51) Int. Cl.
*G06T 19/00*     (2011.01)
*G06T 7/70*      (2017.01)
*G06T 19/20*     (2011.01)

(52) U.S. Cl.
CPC .............. *G06T 19/006* (2013.01); *G06T 7/70* (2017.01); *G06T 19/20* (2013.01); *G06T 2207/30236* (2013.01); *G06T 2219/2004* (2013.01); *G06T 2219/2012* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | |
|---|---|---|
| 2006/0285089 A1 | 12/2006 | Higashi |
| 2012/0044090 A1 | 2/2012 | Kahler |
| 2013/0063646 A1 | 3/2013 | Ueno |
| 2018/0086262 A1* | 3/2018 | Morel ............ G06V 10/60 |
| 2019/0100198 A1* | 4/2019 | Hakki ............ B60Q 1/535 |
| 2020/0207261 A1 | 7/2020 | Camras |
| 2020/0388161 A1* | 12/2020 | Kim .............. G08G 1/096791 |

OTHER PUBLICATIONS

International Search Report and Written Opinion issued in PCT Application No. PCT/US22/44532, dated Mar. 28, 2023.

* cited by examiner

*Primary Examiner* — Frank S Chen
(74) *Attorney, Agent, or Firm* — HOGAN LOVELLS US LLP

(57) ABSTRACT

Systems and methods for displaying projected image onto a surface to create an active augmented reality environment may include a lighting device and a controller. The controller may receive information, such as a user input or sensor information, and determine one or more projection properties for the lighting device. The lighting device may receive a control signal from the controller and adjust one or more parameters in order to project the image onto the surface in accordance with a desired user input and the sensor information.

20 Claims, 3 Drawing Sheets

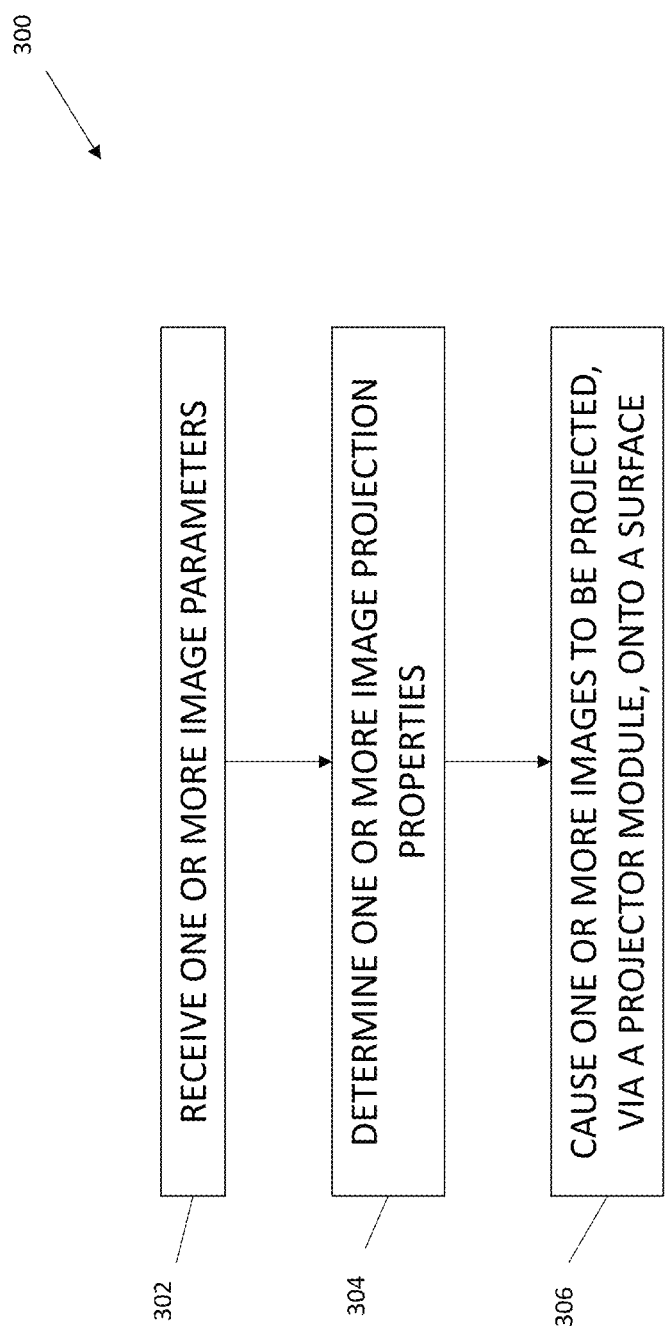

AUGMENTED REALITY TRAFFIC ADVISOR SYSTEM AND METHOD

This application claims the benefit of Provisional Application No. 63/247,743, filed on Sep. 23, 2021, the contents of which are incorporated herein by reference in their entirety. The present disclosure is directed to systems and methods for displaying projected images, such as warning messages or symbols, onto a surface to create an active augmented reality environment. In particular, pixel matrix lighting modules may be controlled to selectively project static or animated traffic warning images onto surfaces, thereby augmenting the surfaces in a manner that advises and directs traffic and pedestrians.

TECHNICAL FIELD

Background

Roadside signs and message displays are used for alerting drivers and ensuring the safety of vehicles and pedestrians. These signs and message displays provide information regarding traffic laws for a particular area, such as the speed limit, and may also warn of changes to normal traffic patterns such as when there is road construction or an accident blocking one or more lanes of a highway. However, the information provided by these signs or displays may be passive, in that the text or information is fixed or unchanging and may not clearly indicate which road segments are impacted or what actions the driver of a vehicle should take. Additionally, painted road markings or reflective signs may be deployed after an event occurs, and delays in installation and use may cause further accidents. While certain systems, like dot matrix displays, may enable both static or scrolling messages, these may also be fixed in a particular location and may be slow to update.

Common warning and advisory situations may include, for example, road construction, traffic accidents, temporary lane shifts, police traffic stops, and closures of toll lanes, exit ramps, or roads. In the case road construction on a highway, passive reflective signs may be erected on the shoulder to alert drivers of the upcoming construction and may further provide messaging on which road lanes are closed. Additional passive warning technologies, such as reflective barriers, may be placed in any closed lanes, and dot matrix displays or similar systems may be used to form arrows to indicate which lanes drivers should use to avoid the closed lanes. For example, if a left lane is blocked, barriers erected in that lane along with a dot matrix display arrow pointing to the right may be used to inform drivers to merge out of the closed left lane and into the open right lanes. Depending on the locations of these passive warning technologies and whether the warning or advisory situation is still ongoing or has previously ended, motorists may be confused about the particular path to take, causing the flow of traffic to slow and increasing the chances of accidents between vehicles trying to navigate the situation.

SUMMARY

Applicant recognized the limitations with existing systems herein and conceived and developed embodiments of systems and methods, according to the present disclosure, for improved traffic warning systems.

In an embodiment, a system for projecting an image onto a surface includes a projector module, the projector module having a matrix of lighting devices. The system also includes one or more sensors, the one or more sensors configured to obtain at least one or more image parameters associated with the image. The system further includes a processor and a memory having instructions that, when executed by the processor, cause the system to receive one or more image parameters from the one or more sensors. The instructions, when executed by the processor, also cause the system to determine one or more image projection properties based, at least in part, on the one or more image parameters, the one or more image projection properties adjusting features of the projector module to display the image according to a selected output format. The instructions, when executed by the processor, also cause the system to cause the image to be projected, by the projector module, in accordance with the one or more image projection properties.

In an embodiment, a method for projecting an image onto a surface, includes receiving a user input associated with an output message of the image. The method also includes receiving sensor information associated with at least a relative position of a projector module and the surface. The method further includes determining, based at least in part on the sensor information and the output message, one or more projection properties. The method also includes illumining one or more lighting devices in a pattern to display the image.

BRIEF DESCRIPTION OF DRAWINGS

The present technology will be better understood on reading the following detailed description of non-limiting embodiments thereof, and on examining the accompanying drawings, in which:

FIG. 3 is a flow chart of an embodiment of a process for projecting an image on a surface, in accordance with at least one embodiment.

DETAILED DESCRIPTION

Figure 1:
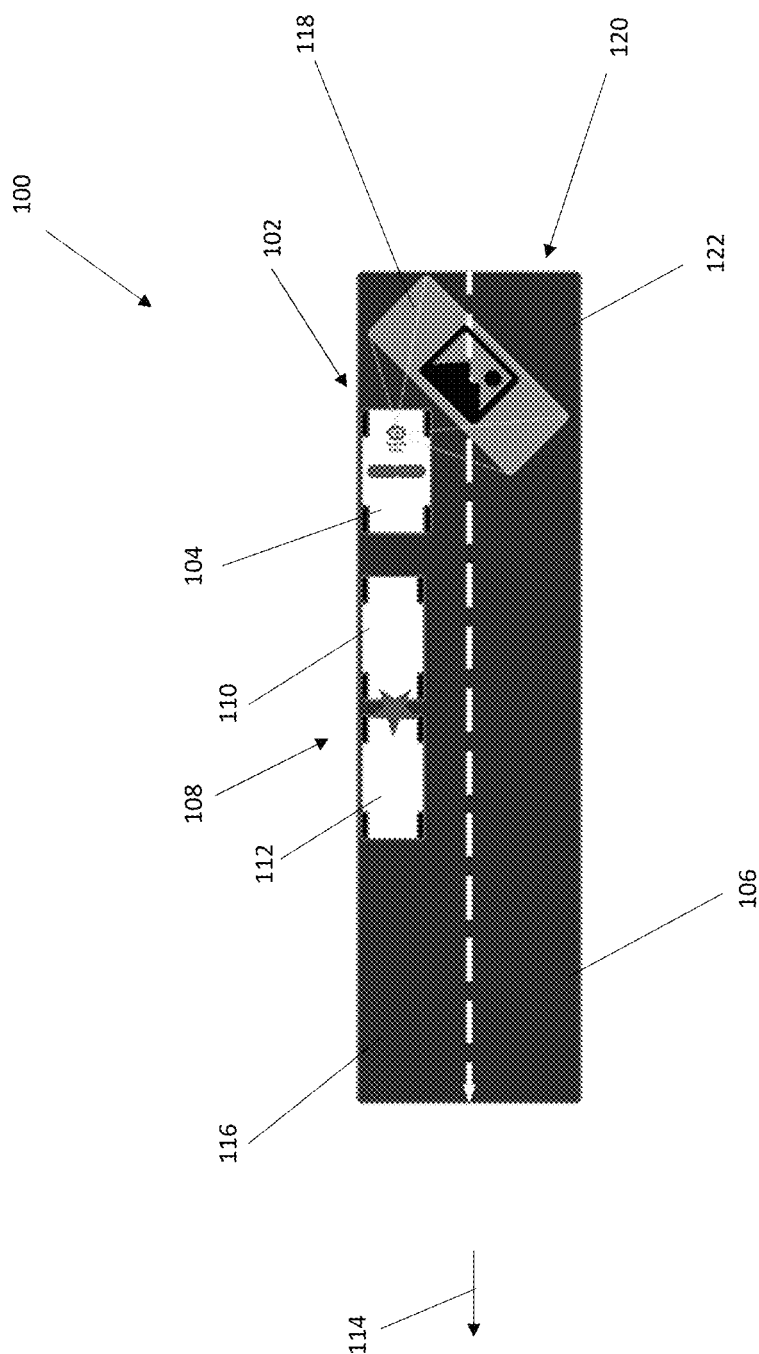
FIG. 1 is a schematic view of an embodiment of an environment using an augmented traffic advisor, in accordance with at least one embodiment.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward systems and methods that utilize pixel matrix lighting projector modules, which may include microLEDs and/or organic light emitting diodes (OLEDs), to overcome the various limitations of existing passive emergency warning technologies, such as directional advisory warning lights, dot matrix displays, painted road markings, and reflective road signs. Various embodiments may provide an active augmented reality solution where information may be adjusted in real or near-real time and projected onto a surface to provide information to one or more users and others in the vicinity of the projection. More than one projector module may be provided at one or more locations, and these projector modules may be controlled individually to provide static or dynamic images that include traffic advisories, warning messages, and information. In addition, where multiple projector modules are included at one or more locations, the projector modules may be controlled as a group in creating an augmented reality environment with a plurality of static or dynamic images projected onto surfaces. In at least one embodiment, warning or advisory scenarios, such as road construction or traffic accidents, may incorporate the active augmented reality solution to illuminate, project images, and/or project animations that augment a road surface to advise and direct traffic. Augmentation behavior may be controlled and automated through various local and remote data sources such as a camera, global navigation satellite system (GNSS) receiver, radar, LIDAR, network connection, or user input such that images and/or animations projected onto the road surface are relevant to the location and situation. In addition, the projector modules may be configured to automatically adjust the projected inputs based on information received from the data sources.

Embodiments may be integrated into any fixed or mobile infrastructure, such as a vehicle, a streetlamp, an overhead toll structure, a moveable sign, or the like. Through this active solution motorist confusion may be reduced beyond levels supported by traditional passive warning systems, resulting in improved traffic flow and greater overall safety for motorists, construction workers, and first responders. In at least one embodiment, systems and methods may be incorporated with first responder and/or Department of Transportation (DOT) operations. Moreover, when the projector module is attached to a vehicle, such as emergency vehicle like an ambulance or police car, a controller associated with the projector module may further receive information from in-vehicle sensors and data sources, such as wheel angle sensors, steering wheel sensors, door sensor, seat sensors, in-vehicle controllers, and in-vehicle computing devices. For example, in-vehicle cameras, wheel angle sensors, and/or steering wheel sensors may provide information indicating that the road ahead is curved, and not straight. In such a situation, the controller associated with the projector module may be configured to modify the light output of the projector module forming the image such that it matches the curvature of the road.

Systems and methods may utilize one or more lighting devices to enable projection of the augmented solution, such as microLED matrixes or OLEDs. Embodiments may include a matrix panel having density and brightness that exceed a specified threshold. That is, a sufficient number of lighting sources, which as noted above may include microLEDs, OLEDs, combinations thereof, or any other lighting devices, individually or in combination, may be present in order to project in real or near-real time information onto a surface. Various embodiments may incorporate microLEDs due to various advantages with respect to power consumption and physical flexibility. Various embodiments may further include one or more optic elements positioned in front of the lighting device matrix (e.g., matrix, panel, etc.) for focusing of the images and/or creating animations on the projection surface. The optic may be a moveable or adjustable optic, such as a lens positioned on an arm or a track, to focus and project the images and/or animations based, at least in part, on a mounting position of the system. By way of example only, if the system includes a movable sign that may be positioned at different locations, such as responsive to an accident or other event, it may be beneficial to include a movable optic to enable focusing of the augmented information at different locations. However, in at least one embodiment, the optic may be substantially fixed, for example at a permanent or semi-permanent installation location associated with the system. It should be appreciated that various embodiments may also or alternatively incorporate digital signal processing (DSP) to correct the image for optimal clarity on the projection surface.

One or more embodiments of the present disclosure may include one or more controllers (e.g., control systems), which may include one or more memories or processors, either within the controller or accessible by the controller, for example through a network connection to a shared resource environment. The controller may include machine-readable instructions, which may be stored on one or more memories for execution by the one or more processors. The machine-readable instructions may be for DSP or other operational components. In at least one embodiment, images and animations may be encoded in traditional video formats, such as MPEG, or may be encoded in one or more other video or image formats, which may be application dependent. In at least one embodiment, the one or more dedicated controllers may be Field Programmable Gate Arrays (FPGAs) and Microcontrollers (MCUs). The controller may be a single processing unit such as an FPGA or MCU, or alternatively multiple processing units of various types to form the complete system.

Embodiments of the present disclosure may also enable adaptation or adjustment of projected images based, at least in part, on the environment in which the system can be deployed. By way of example, a curved road may be detected and then the projected image may be altered to match the contour or curvature of at least a portion of the road. In at least one embodiment, the controller may include one or more sensors to acquire information of the environment and then, based at least in part on information from the one or more sensors, may adjust or otherwise alter the projection. For example, a camera or LIDAR unit may be integrated with or provide information to the system. Data from the camera or LIDAR may be provided as an input to one or more algorithms, which may adjust a projected image according to the input data. In addition, information regarding the operating status of emergency equipment on an emergency vehicle may be provided to the system. This information may be provided through direct connection of a projector module controller to other vehicle systems or may be sent remotely through a wireless communication interface. For example, information related to whether the lights and sirens of an emergency vehicle are active, and whether the vehicle is moving or parked, can be provided to the system. Based on this information, the system may adjust both the content and location of the projected image. Information indicating that an emergency vehicle has active lights and sirens, but is parked along the side of the road, may be used to determine that an image should be projected into the traffic lane or lanes nearest the vehicle indicating that, for example, the lane is closed or that vehicles should merge into another lane. The system may further include a user interface, either on the projector module or remote from it, allowing users to select, modify, and adjust projected images.

In one or more embodiments, systems and methods may deploy software algorithms and DSP techniques to process data from various environmental sensors. Furthermore, various systems may include predetermined or preconfigured settings for one or more specific environments. By way of example, a moveable system that can be intended for use on a sidewalk near a roadway may be preconfigured to project images onto a surface at a particular angle relative to the system. In another example, an overhead system, such as one used for a toll booth, may be preconfigured to project information at a certain distance before a toll plaza. Software executed by the controller may determine, at least in part, the images and/or animations displayed. System inputs may influence or direct the system to display different images and/or animations, which may be provided by a user or may be transmitted from a central controller, among other options. As an example, an operator may input a "Keep Back" graphic for display at a rear of an emergency vehicle. In another example, an operator may include "Sudden Stops," "Construction Equipment Entrance," "Construction Zone" or other graphics in the vicinity of an active construction site with vehicles entering and exiting. As another example, one or more projector modules may be included on school buses or infrastructure in the vicinity of school bus stops. These projector modules may be programmed to, depending on the time of day and location of the school bus, project graphics in the area around the bus or bus stop to warn drivers to go slow and that children may be entering or exiting the bus. In particular, a school bus could project images around the bus to warn drivers when it is approaching a bus stop, and to indicate that it will be stopping. GPS information may be used to determine when the bus is approaching a stop and can trigger the projector module to begin projection of the images to create an augmented reality environment with appropriate warnings and advisory images. In yet another example, a system controller may display updated traffic information on a fixed system, such as "Accident 1 Mile Ahead" or "Right Lane Closed 500 Feet." It should be appreciated that sensor information may also, in embodiments, be utilized to determine how to display information or which information to display. For example, the DSP algorithm may utilize vehicle speed obtained via a GNSS receiver or a connection to onboard diagnostics to grow and shrink a graphic to indicate a larger distance between vehicles should be kept at higher speeds. This example may also incorporate augmentation or adjustment techniques, such as when rounding a curve, the DSP algorithm can adapt the same graphic to the curvature of the road, which may be obtained by wheel angle input, onboard cameras, GPS information, or the like.

Embodiments of the present disclosure may be incorporated into a variety of different potential use cases, which may each have unique system inputs or considerations. Non-limiting examples include: a law enforcement vehicle displaying a "move over for emergency vehicles" animation in the rightmost lane when performing a traffic stop; a law enforcement vehicle displaying a "reduce speed to x MPH" graphic overplayed with a "merge left" animation when performing a traffic stop or to communicate reduced speed limits during road construction; a DOT vehicle projecting new lane markings onto a highway to direct traffic when the lanes must be shifted due to construction; a fixture above a toll booth projecting "open" or "closed" onto each lane to indicate whether it is open to traffic; or traffic lights projecting different indications into the left lane based on when legal left turns may be made. For example, if left turns in a city are only legal on weekends, a projection of a green arrow may be projected into the left lane on weekends while a red "X" could be projected on weekdays. Projected images may also change depending on time of day, for example speed limits in a school zone can be shown as being reduced during school hours and not reduced after the end of the school day. It should be appreciated that systems and methods may further be deployed in other situations and such a list is not intended to limit the scope of the present disclosure.

Various embodiments may be directed toward minimizing or otherwise reducing a size of various components of the system, such as the matrix. Furthermore, embodiments may be directed toward reducing or simplifying components to reduce overall costs for incorporating the system.

FIG. 1 is a schematic diagram of an example environment 100 in which embodiments of the present disclosure may be used. In this example, an augmented traffic advisor (ATA) 102 (e.g., augmented reality traffic advisor, traffic advisor, active traffic advisor, dynamic traffic advisor, image projection system, etc.) can be mounted to or associated with a vehicle 104, which in this example is an emergency vehicle, such as a police car. The illustrated vehicle 104 can be positioned along a roadway 106 and may be behind an accident 108 between two additional vehicles 110, 112, relative to a direction of travel 114. As shown, the accident 108 can be blocking or otherwise impeding vehicular traffic in a right line 116 of the roadway 106. An unsuspecting operator of another vehicle may then potentially exacerbate the accident by, for example, colliding with one or more of the vehicles 104, 110, 112, which may be especially problematic if the accident 108 is occurring near a curve or elevational change where an motorist may not see or have enough time to react to the accident 108.

In this example, the augmented traffic advisor 102 can project an image 118 onto a surface 120 of the roadway 106 to generate an augmented surface. That is, the projection of the image 118 onto the surface 120 augments the appearance of the surface 120, which may serve as a warning or indicator to other vehicles on the roadway 106. As shown, the image 118 can extend into both the right line 116 and a left lane 122, but it should be appreciated that the image 118 may be contained within only one of the right lane 116 or the left lane 122. The image 118 may include still image data, animations, or combinations thereof where parts of the image 118 can be still and other parts can be animations. The still image data and animations may include, for example, text, pictures, photographs, graphics, or combinations thereof. The animations may further include video clips. By way of example, the image 118 may include an "X" or an arrow directing traffic and then scroll information, such as "Accident—Merge Left."

In one or more embodiments, information associated with the image 118 may be input by a user of the vehicle 104. For example, a control system may have one or more interfaces that enable a user to input text, select from predetermined text, or select images/animations, among other options. Furthermore, the control system may have predetermined or preconfigured modes of operation that a user may select. One or more processors may execute instructions stored on one or more memories in the form of algorithms in order to provide one or more control signals to a lighting device, which may include a matrix of microLEDs to generate and project the image 118. In various embodiments, the control system may be a wired or wireless system that transmits information to one or more lighting devices. The control system may be integrated with other control systems within a vehicle. For example, the control system may be connected through a Controller Area Network (CAN) bus system or wireless communication system to other vehicle system controllers such that it can receive information from these systems and can accept inputs from common user interfaces used to control other vehicle systems.

Figure 2:
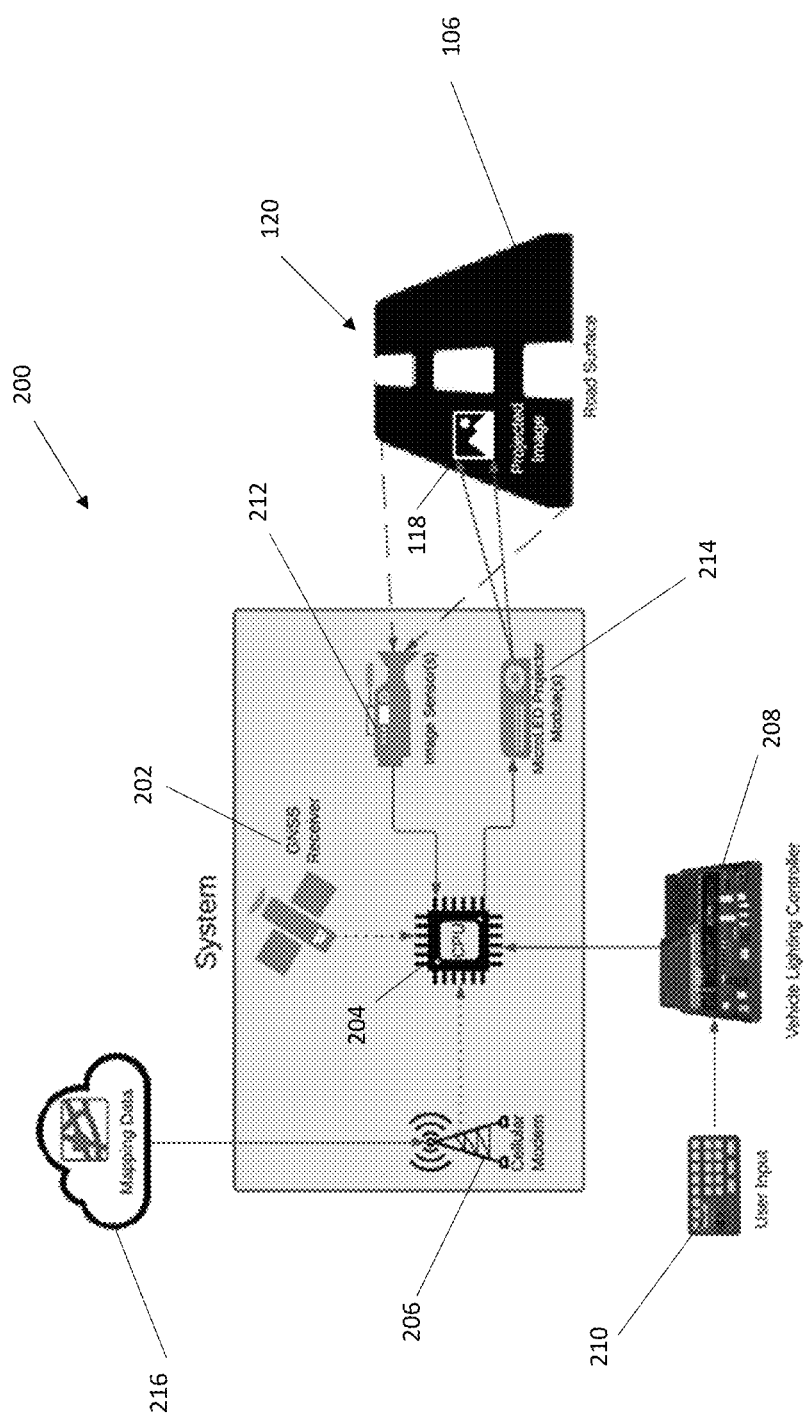
FIG. 2 is a schematic diagram of an embodiment of an augmented traffic system, in accordance with at least one embodiment.

FIG. 2 is a schematic diagram of an embodiment of an augmented traffic system (ATS) 200 (e.g., system, augmented system, warning system, etc.), which may be utilized with embodiments of the present disclosure. It should be appreciated that one or more features of the ATS 200 may be associated with ATA 102 shown in FIG. 1. In this example, the ATS may include one or more components including, but not limited to, a GNSS receiver 202, a processor (CPU) 204, a cellular modem 206, a vehicle controller 208, an input device 210, one or more sensors 212, and a projector module 214, which may be a microLED projector module. In this example, a user may provide one or more commands through the input device 210 to the controller 208, which may then be transmitted or executed by the CPU 204 to direct the projector module 214 to project the image 118 onto the surface 120 of the roadway 106.

In at least one embodiment, the GNSS receiver 202 can be utilized to receive positioning, navigation, and/or timing services from one or more satellite systems. The GNSS receiver 202 may be incorporated into a satellite navigation system associated with one or more vehicles. The satellite navigation system may be used to determine a location of one or more objects. In various embodiments, information from GNSS receiver 202 may be provided to the CPU 204 in order to influence or otherwise adjust one or more images projected via the projector module 214. By way of example, the GNSS receiver 202 may provide information that, when combined with either mapping data 216 or independently of additional mapping data, may provide location information to the CPU 204. This information may then be incorporated into one or more images from the projector module 214, such as providing a street name or other information, such as a distance to an upcoming road closure. Such a system may also be utilized to update information in real or near-real time, such as pulling information from the mapping data 214, which in some embodiments may be a traffic application, to obtain traffic information which may then be projected via the projector module 214. By way of example, the traffic information may provide information of an upcoming slow down, and the information may be utilized to update information from the projector module 214 to warn drivers to slow down.

Various embodiments further include the user input device 210, which may include one or more devices such as a keyboard, dial, touchscreen, mouse, or combinations thereof. Furthermore, the user input device 210 may correspond to one or more user devices, such as a smartphone that includes an application that enables communication and control of the vehicle controller 208. The user input device 210 may be a wireless device that may be separate from (e.g., not physically connected to) the projector module 214. However, it should be appreciated that the user input device 210 may be integrated into a common body or housing that also includes the projector module 214. In at least one embodiment, the vehicle controller 208 includes one or more predetermined or preconfigured operations, which the user may select. These preconfigured operations may be associated with common or likely scenarios, such as traffic accidents, upcoming construction, and the like, and loading different settings for quick execution may enable improved use of the system for users.

Further illustrated are the one or more sensors 212, which may include cameras (e.g., still cameras, video cameras, infrared cameras, etc.), LIDAR sensors, range finders, vehicle sensors (e.g., speed, direction of travel, steering wheel position, etc.), and the like. The sensors 212 may feed information to the CPU 204 in real or near-real time, such as by a continuous stream, may provide information at predetermined times, or may provide information upon request. By way of example, resources may be preserved by limiting data transmission to certain times, rather than continuously obtaining information. In at least one embodiment, different sensor information may be gathered in different operational modes of the system. For example, if the vehicle is turned off and in park, there may be no need to obtain speed or wheel position information. Data from the one or more sensors 212 may be acquired and utilized by the CPU 204 in order to affect one or more parameters of the image 118. As noted here, information acquired from the one or more sensors 212 may correspond to a bend or curvature of the road to adjust a position or shape of the image 118, a speed of the vehicle to determine how to far to project the image 118, and the like.

Various embodiments include a microLED projector for projector module 214, but it should be appreciated that other lighting devices may be utilized and that the microLED is provided by way of example only. In at least one embodiment, projector module 214 may be tuned or otherwise adjusted based, at least in part, on an ambient lighting level, where the image 118 may be more readily visible in a dark setting than in a very bright setting. Accordingly, one or more embodiments may adjust a color of the image 118, cause the image 118 to pulse or move to draw attention, or perform other techniques. As noted herein, the projector module 214 may be associated with one or more optics, such as lens, for focusing the image 118 onto the surface 120. In at least one embodiment, the optics can be movable, such as via a command from the CPU 204 based on sensor information. By way of example, sensor information may determine a distance between the projector module 214 and a ground plane such as roadway 106. A size of the image 118 may also be determined, and accordingly, an angle of the optic may be adjusted to project the image 118 at an appropriate location to obtain the desired size.

It should be appreciated that while embodiments are discussed with reference to vehicles that various configurations may include a standalone or otherwise moveable system, where various components may be operated by one or more wired or wireless control devices, which may be separate from or integrated into a common housing.

FIG. 3 is a flow chart of an example process 300 for projecting an image onto a surface. It should be appreciated that for this process, and other processes described herein, that there may be more or additional steps. Furthermore, the steps may be conducted in a different order, or in parallel, unless otherwise specifically stated. In this example, one or more image parameters can be received 302. In at least one embodiment, image parameters may be associated with a type of image to project, a message associated with the image, a color of the image, a position of the image, or the like. By way of example, image parameters may include multiple parameters, such as instructions to project a blue image at a distance of five feet away. The one or more parameters may be determined from multiple sources, such as a user input, one or more sensors, or other sources.

One or more image projection properties may also be determined 304. Image projection properties may be related to information for how to display the image onto a road, such as determining an angle of projection in order to achieve a certain size or to match a curvature in a road. In at least one embodiment, one or more processors may receive sensor information and/or utilize known properties of a projector module, in order to determine the projection properties. For example, intrinsic information regarding the projector module may be known, such as a fixed position of the projector module on a vehicle. Sensor information may provide data related to a distance between the projector module and the surface, as well as information regarding a curvature along a roadway. It may be desirable to match the curvature, and as a result, the projection properties may determine a distance to project the image to both provide desired information and also to match the curvature of the road. Various embodiments may also cause the projector module to project the images onto a surface 306, for example by transmitting a command to the projector module. In this manner, image projection may be enabled.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for projecting an image onto a surface, comprising:
   a projector module, the projector module having a matrix of lighting devices, wherein the projector module comprises at least a microLED matrix;
   one or more sensors, the one or more sensors to obtain at least one or more image parameters associated with the image;
   a processor; and
   a memory having instructions that, when executed by the processor, cause the system to:
   receive one or more image parameters from the one or more sensors;
   determine one or more image projection properties based, at least in part, on the one or more image parameters, the one or more image projection properties adjusting features of the projector module to display the image according to a selected output format; and
   cause the image to be projected, by the projector module, in accordance with the one or more image projection properties.

2. The system of claim 1, wherein the one or more image parameters comprises at least one of a shape, a size, a color, a textural component, a graphical component, or a relative position.

3. The system of claim 1, wherein the one or more projection properties comprises at least one of a projection angle, an optic angle, a processing parameter, or an intensity.

4. The system of claim 1, wherein the one or more sensors include at least one camera, LIDAR sensor, or range finder.

5. The system of claim 1, wherein adjusting features of the projector module further comprises adjusting the image position, image shape, or image size.

6. The system of claim 1, further comprising a user input device.

7. The system of claim 1 further comprising one or more optics for focusing the image onto a surface.

8. A method for projecting an image onto a surface, comprising:
   receiving a user input associated with an output message of the image;
   receiving sensor information associated with at least a relative position of a projector module and the surface;
   determining, based at least in part on the sensor information and the output message, one or more projection properties; and
   illuminating one or more lighting devices in a pattern to display the image.

9. The method of claim 8, wherein the user input is at least one of a custom input or a predetermined input.

10. The method of claim 8, wherein the one or more lighting devices are microLEDs.

11. The method of claim 8, wherein the one or more projection properties comprise a type of image, the output message, a color of the image, or a position of the image.

12. The method of claim 8, wherein the sensor information is received from at least one camera, LIDAR sensor, or range finder.

13. The method of claim 8 wherein the one or more projection properties adjust one of more of a size of the image, a position of the image, and a curvature of an image.

14. The method of claim 8 wherein the one or more projection properties further comprises known properties intrinsic to the projector.

15. The method of claim 8 further comprising:
   adjusting the image based on ambient lighting level.

16. The method of claim 15 wherein the image is adjusted by changing the color or causing the image to move or pulse.

17. The method of claim 8 further comprising:
   adjusting one or more optics to focus the image.

18. A system for projecting an image onto a surface, comprising:
   a projector module, the projector module having a matrix of lighting devices;
   one or more sensors, the one or more sensors to obtain at least one or more image parameters associated with the image;
   a global navigation satellite system receiver and mapping data, wherein the global navigation satellite system receiver and mapping data determine the one or more image parameters;
   a processor; and
   a memory having instructions that, when executed by the processor, cause the system to:
   receive one or more image parameters from the one or more sensors;
   determine one or more image projection properties based, at least in part, on the one or more image parameters, the one or more image projection properties adjusting features of the projector module to display the image according to a selected output format; and cause the image to be projected, by the projector module, in accordance with the one or more image projection properties.

19. The system of claim 18 further comprising one or more optics for focusing the image onto a surface.

20. The system of claim 18, wherein the one or more image parameters comprises at least one of a shape, a size, a color, a textural component, a graphical component, or a relative position.

* * * * *